(No Model.) 2 Sheets—Sheet 1.
G. GUIBBINI.
GATE.
No. 405,772. Patented June 25, 1889.
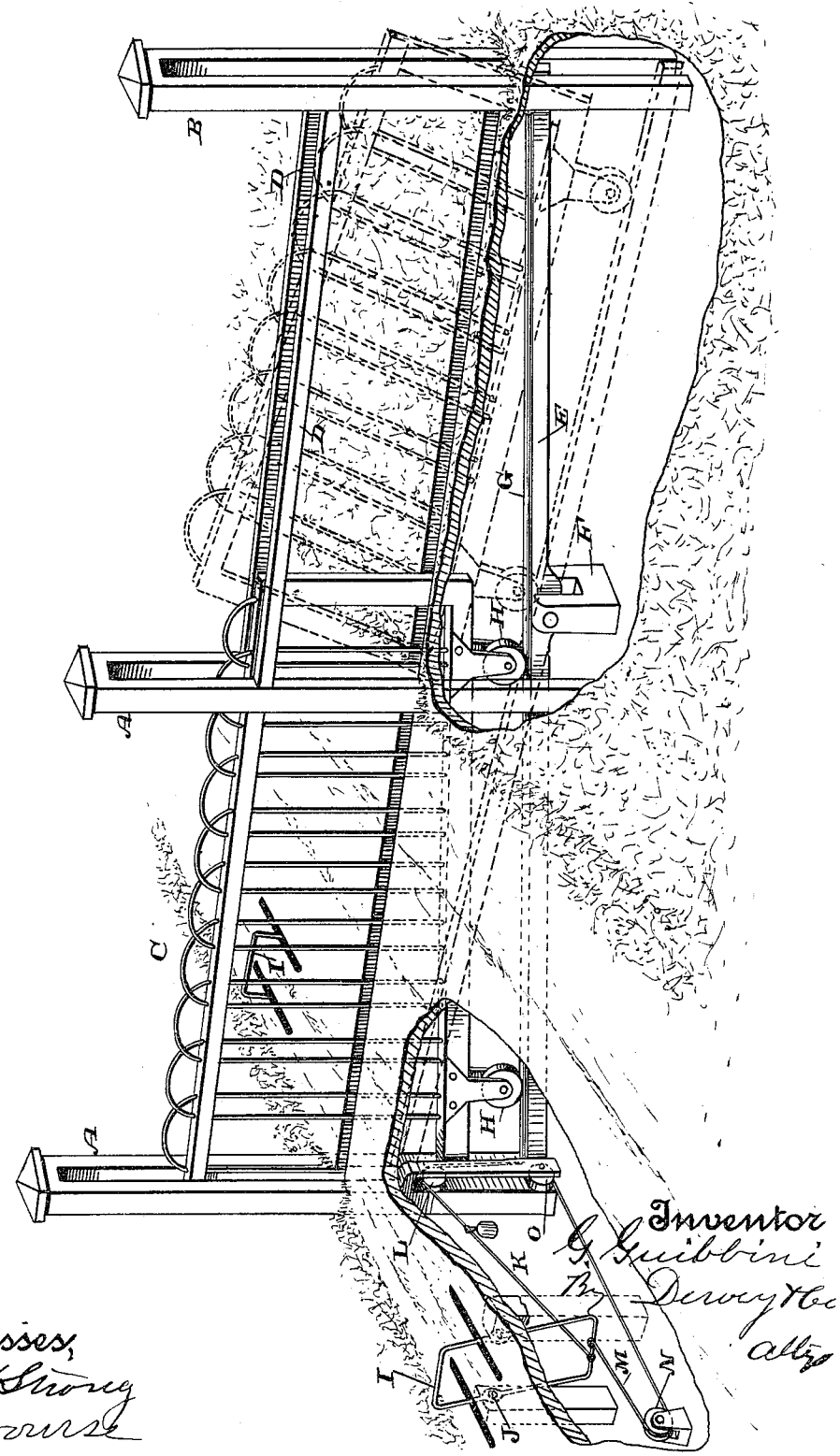
Witnesses,
Geo H Strong
Inventor
G Guibbini
By Dewey &c
Atty

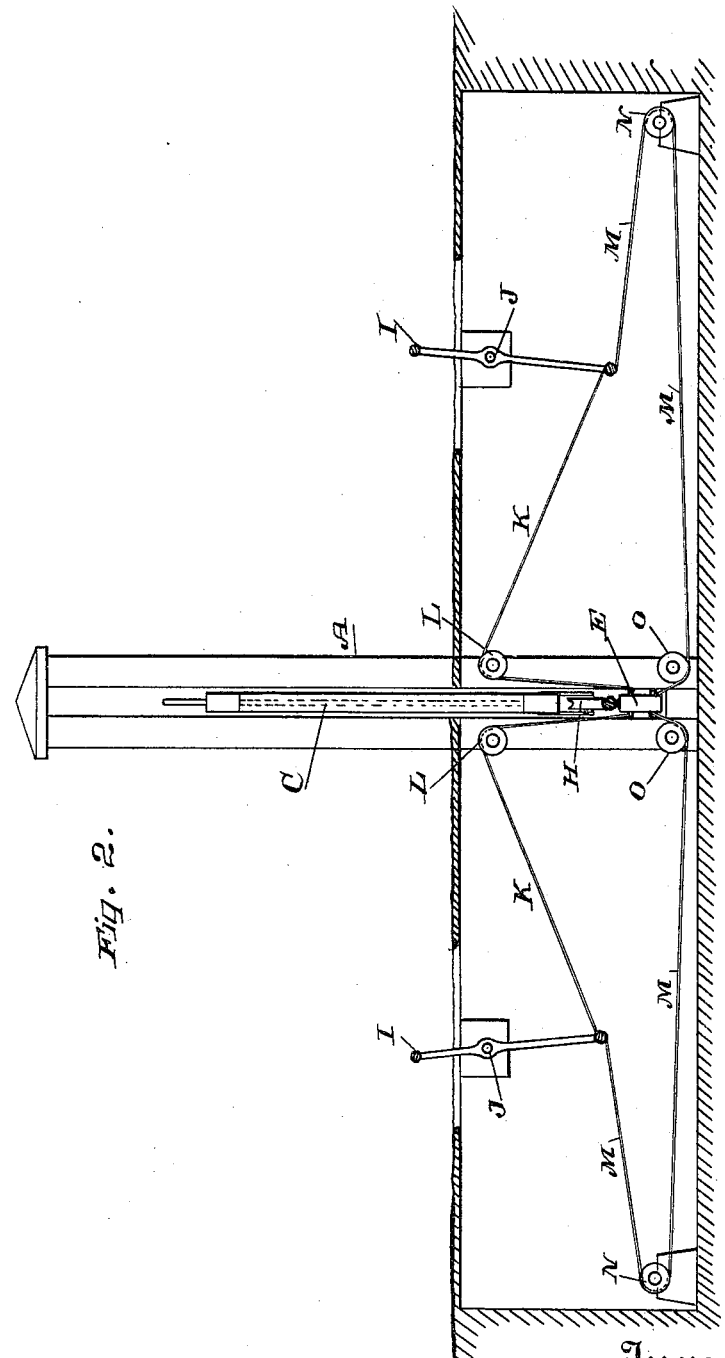

ically.

UNITED STATES PATENT OFFICE.

GOTTARDO GUIBBINI, OF POINT REYES, CALIFORNIA.

GATE.

SPECIFICATION forming part of Letters Patent No. 405,772, dated June 25, 1889.

Application filed January 28, 1889. Serial No. 297,809. (No model.)

*To all whom it may concern:*

Be it known that I, GOTTARDO GUIBBINI, of Point Reyes, Marin county, State of California, have invented an Improvement in Gates; and I hereby declare the following to be a full, clear, and exact description of the same.

My invention relates to that class of gates which are opened and closed by the passage of the vehicle over loops which project above the surface of the roadway in the vicinity of the gate; and it consists of the constructions and combinations of devices which I shall hereinafter fully describe and claim.

Referring to the accompanying drawings for a more complete explanation of my invention, Figure 1 is a view of the gate and operating mechanism. Fig. 2 is a section through the pit, showing the operating mechanism.

A A are the vertical gate-posts, and B represents a post in line with the fence and in the direction toward which the gate opens. These posts are made double or with a vertical slot between them of sufficient width to receive the thickness of the gate C, and, together with the horizontal bars or timbers D, these posts serve as guides between which the gate travels, so as to move across the opening between the posts A, or move backward in the direction of the post B until the gate-opening is entirely uncovered. In order to produce this travel of the gate, a sufficiently rigid beam E is fulcrumed just outside of the rear gate-post A in a standard F, which is solidly fixed in a pit, which is excavated in the line of the travel of the gate. This fulcrumed bar is sufficiently below the surface of the roadway to allow it to tilt upon its fulcrum, so as to depress either end without raising the opposite end above the level of the ground. Upon the top of this beam is a single half-round or other suitably-shaped iron track G, upon which the grooved pulleys H fit. These pulleys are journaled at the bottom of the gate, so as to rotate freely, and when the fulcrum lever or beam is tilted in either direction the gate will travel toward the end which is lowest.

In order to give the gate a symmetrical appearance when closed, it is made with the top and bottom diverging from the rear end post toward the front one, so that the depth of the gate is considerably greater adjacent to the post against which it closes than it is at the opposite end. The inclination of the lower bar of the gate corresponds with that of the lever when the end toward the post A is depressed to its lowest point, and on account of this construction the upper portion of the gate will stand in a horizontal position when closed.

I I are the iron hoops or levers, which project above the surface of the roadway, being fulcrumed, as shown at J, in suitable bearings, about which they turn when pressed downward in either direction by the passage of a vehicle or by other weight. The lower ends of these levers are extended sufficiently into the pit to swing over a considerable distance when the levers are turned about their fulcrums. The bottom of each lever is connected with the adjacent end of the tilting beam or lever E, upon which the gate travels, as follows: A cord K passes from the bottom of the lever I over a pulley L, journaled upon the side of the gate-post A, just beneath the roadway and above the highest point to which that end of the lever can rise. The cord passing over this pulley connects with the end of the tilting beam, and when the hoop or lever I is pressed down by a vehicle approaching the gate this cord will be pulled and will lift that end of the beam E, so that it will stand at an angle, which will immediately cause the gate to move entirely out of the gate-opening, where it will remain until the vehicle passes through, when the wheels passing over the other hoop as the vehicle moves away from the gate will swing it in the opposite direction or away from the gate.

A cord M, connecting with the lower end of the lever I, passes backward over a pulley N, thence beneath the pulley O, journaled at the bottom of the gate-post A, and below the lowest point of the tilting beam E, thence up to the end of the beam, as shown. When the loop is pressed down by the retreating vehicle, it will act through this cord to pull that end of the lever E down, thus raising the opposite end with the gate upon it until it stands at such an angle that the gate will travel by gravitation down the incline of the tilting beam E and close itself. When closed, the end passes into the slot in the outer gate-post A, and may be latched by any well-known or suitable means to prevent its being easily opened, the posts acting as guides to prevent excessive side motion. The first movement to open the gate will raise the beam E and disengage the latch, leaving the gate free to move back when sufficiently tilted.

The slot in the roadway or top of the pit is not excessively wide, because on account of the manner in which the gate is supported it will have sufficient strength without being made very thick, and the amount of dirt which can fall into the pit through this slot is too small to cause any trouble. If desired, however, the bottom of the pit can be inclined, and the dirt can all be washed out at any time by the rain that falls or by a stream of water turned in occasionally.

Having thus described my invention, what I claim as new, and desire to secure by Letters Patent, is—

1. A centrally-pivoted straight beam beneath the surface of the ground in the line of the fence, a standard to which the beam is pivoted, a gate and gate-posts with guides between which the gate travels endwise, and rollers upon the bottom of the gate fitting upon a track on the top of the tilting beam, in combination with the hoop-levers having their lower ends extended and fulcrumed in the roadway, and the cords attached to said ends and passing over pulleys and connecting the lower ends of said levers with the tilting beam at points above and below, respectively, substantially as described.

2. The tilting beam fulcrumed in the line of travel of the gate, pivoted levers in the roadway having connections with the tilting beam at points above and below it, whereby said beam is tilted so as to raise either end, a gate having rollers fitted to a track upon the top of the tilting beam, and guides between which it travels, so as to close or unclose the gate-opening, said gate being made deeper at one end than at the other, substantially as described.

3. The combination, with a tilting beam fulcrumed in the line of travel of the gate, of a gate having its top and bottom diverging from the rear end post toward the front post, substantially as described.

In witness whereof I have hereunto set my hand.

GOTTARDO GUIBBINI.

Witnesses:
S. H. NOURSE,
H. C. LEE.